Patented Sept. 19, 1922.

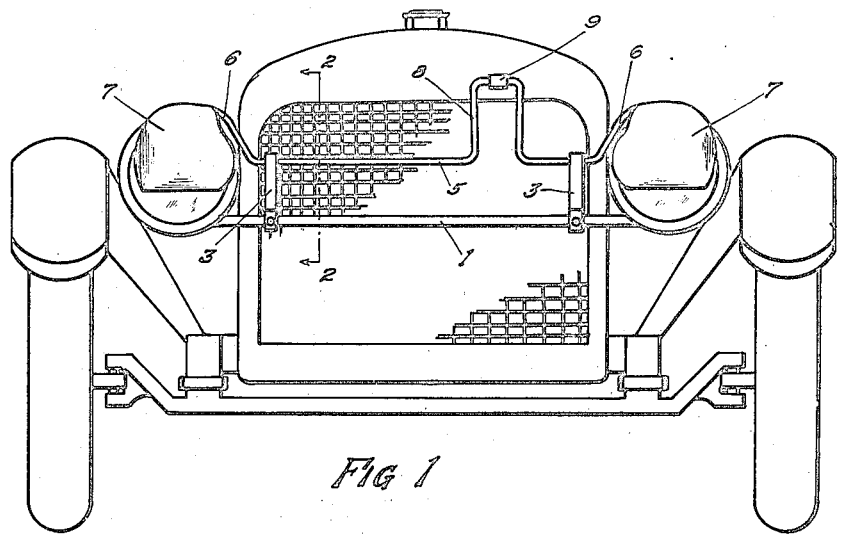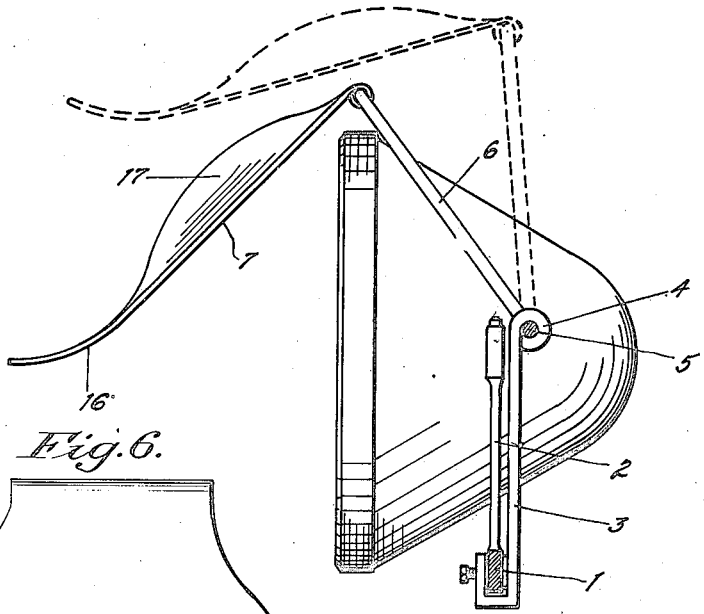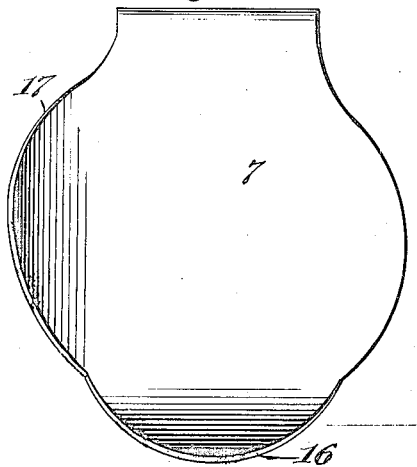

1,429,722

UNITED STATES PATENT OFFICE.

MAURICE H. DONAHUE, OF COLUMBUS, OHIO.

DEFLECTOR SHIELD.

Application filed May 10, 1922. Serial No. 559,813.

*To all whom it may concern:*

Be it known that MAURICE H. DONAHUE, citizen of the United States of America, residing at Columbus, in the county of Franklin and State of Ohio, has invented certain new and useful Improvements in Deflector Shields, of which the following is a specification.

My invention relates to deflector shields and is particularly intended for use with automobile headlights, although being capable of other uses. It preferably comprises a combination deflector and reflector which may be readily mounted upon and operated in connection with automobile headlights.

With strong electric headlights and with the elliptic and conical reflectors now used, whenever sufficient light for night driving is used, the resulting glare is dangerously blinding to the driver of an oncoming car. This danger is now commonly avoided or minimized by the practice of dimming the headlights, by using a diffusing or deflecting lens or by interposing a shield which will cut off the blinding rays. No one of these three methods as now practiced is satisfactorily effective to prevent interference with the vision of the driver of the oncoming car and at the same time leave sufficient light for the driver who has availed himself or either one of these methods.

From the standpoint of safety, every driver should have a good illumination disposed on the ground in front of and for a substantial distance ahead of the car. He should also have a good illumination for a substantial distance diagonally to the front and along the side of the car, especially to the right-hand side. The position of the light and the shape and size of the reflectors bring about such complexing re-reflections that merely confining the interposed shield to the upper part of the headlight or confining it to the vertically central part while leaving the sides open is not satisfactory. The rays will be reflected up from the lower part of the main reflector, or diagonally inward from the outer part, to an extent confusing to the second driver, and there will not be that reflection and concentration upon the ground in front and at the sides which is essential to good lighting and, consequently, to efficient driving.

I have devised a deflector shield which is not only effective as a deflector and as a guide to direct the light rays to the proper areas of the road in front of the car, but which is also operative as a reflector to effect secondary reflection and concentration upon the ground in front and to the sides of the car of the rays that have hitherto not been utilized with the methods described above.

The shield or deflector is preferably pivotally mounted so that it may be raised or lowered at will, the lowering being particularly desirable when passing another car or when reaching the brow of a hill. The manipulation of my deflector is desirably effected from the dashboard by means of a rod extending thereto or by electrically operated means.

The preferred embodiment of the invention is shown in the accompanying drawings, wherein similar characters of reference designate corresponding parts, and wherein Figure 1 is a front elevation of my deflector and a form of the operating apparatus attached to an automobile.

Figure 2 is a detailed sectional view taken on line 2—2 of Figure 1 and showing the deflector in lowered and operative position relative to the headlight. The raised and inoperative position of this deflector is indicated by dotted lines.

Figure 6 is a detail plan view taken at right angles to the surface 7 of Figure 2.

Figure 3:
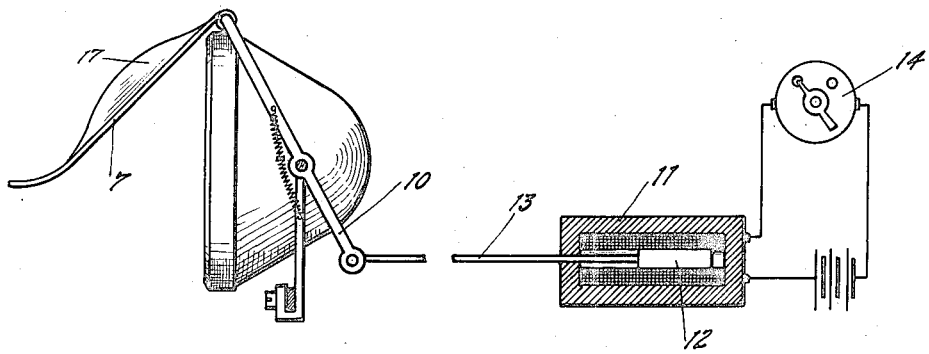
Figure 3 is a detail view and partly diagrammatic of a headlight and deflector and an attached electrical device which may be adopted as a method of raising and lowering the deflector.

In the drawings, the invention is shown as comprising a novel shaped deflector and an operating apparatus for positioning and adjusting the deflector. It will usually be found convenient to attach the deflector and its operating apparatus to the cross-bar or rod, which often connects the two headlights of an automobile and supports or steadies them and crosses in front of the engine hood. This rod may be designated 1, and this may represent any convenient part of the structure to which it may be advisable to attach the deflector.

In the form shown in Figures 1 and 2, the cross-rod 1 is provided with upright standards 2 which are attached at their upper end to the headlight. Attached to this cross-bar 1 are the up-standing arms or brackets 3, which at their upper end are bent into a loop 4 so as to provide a bearing for the rock-shaft 5. This rock-shaft is attached to or developed into a curved arm 6, which extends up over the top of the headlight and forms the supporting base for the rigidly attached deflector shield 7. The rock-shaft is also preferably designed to have a U-shaped and upwardly extending arm 8, pivotally connected at its upper end to an adjustment rod 9 which desirably passes through the upper shell of the radiator hood and is connected to the dashboard by suitable adjusting means.

A modified form of operating apparatus is shown diagrammatically in Figure 3, and in this form I have provided a mere pivot having an arm 10 extending below the pivotal point so as to constitute a lever, connected at its lower end with operating means. These means may consist of a solenoid coil in the customary form, indicated by 11, and having a movable core 12 which operates longitudinally a rod 13. This rod 13 is connected with and operates through the lever arm 10 or the rock-shaft 5 in Figure 1, or any other shifting means for operating the deflector. This solenoid may be operated by a switch 14 located on the dash of the car as shown in Figure 3. I do not show or describe the operation of the device in detail, because it is no part of my invention; it is only one of the common operating means among which selection may be made. Manual operation from the dash by means of a push and pull rod or by a twist of cable, or by air pressure or other electrical or electromagnetic means would be such common expedients for the same result.

In operation, I intend that the rock-shaft 5 shall be operated by the driver from the dash, by any suitable connection and either manually or electrically, as may be preferred. It is obvious that as this shaft is rocked the deflector shield will go forward and down into operative position or up and back into inoperative position and out of the way.

Figures 4, 5:
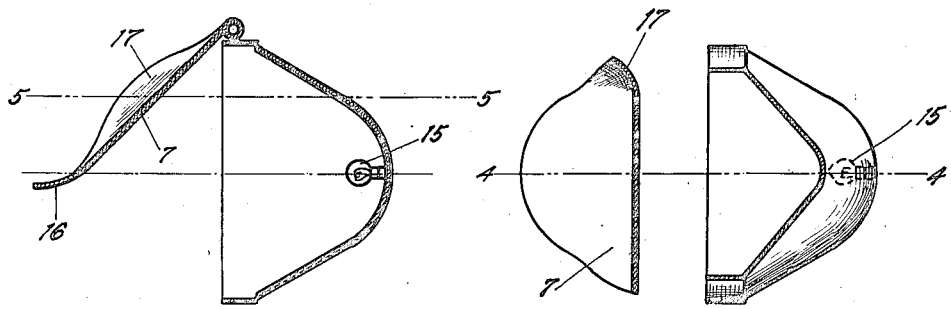
Figure 4 is a longitudinal, vertical, sectional view taken on line 4—4 of Figure 5 and showing diagrammatically the relative positions of the main reflector and my deflecting shield.
Figure 5 is a horizontal section diagrammatically illustrating the parts in the position shown in Figure 4, this section being taken on line 5—5 of Figure 4.

As shown diagrammatically in Figures 4 and 5, an electric light bulb is located, as customarily, at about the point 15. The deflector shield 7 as shown is fully lowered to its preferred position relative to the main headlight. This deflector shield is preferably finished on its under surface in any form suitable for a reflector and should have first an outward and downward inclination and then the forward curvature 16 as best shown in Figures 2 and 4. The downward rock is continued during the forward curvature and extends downward to a point practically level with the light bulb. It will therefore cut off all the rays, both direct from the light and indirect from the main reflector, which extend above the horizontal, with the exception of those indirect rays which come from the lower part of the reflector.

By inspection of the figures it will be apparent that the extent to which the rays will be cut off depends upon the extent to which the lower extremity of the shield is carried forward. In practice I have found that substantially the proportions shown in Figure 4, as between the downward and forward curvature, and the extent of the top of the forward reach, will give satisfactory results. Any slight differences in these proportions will slightly vary the results, the purpose of which is at the same time to bring it downwardly far enough and carry its lower part forward far enough to cut off sufficiently both the direct and indirect rays which would otherwise rise so as to blind an approaching driver.

Referring particularly to Figures 2 and 5, it will be understood that the outer side of the shield 7 is preferably outwardly and forwardly curved as at 17. More specifically Figure 5 is intended to show diagrammatically the sidewise reflecting function of the deflector shield. As seen from the front this shield has more or less of a pear shaped contour, as best shown in Figure 1. The width of the opening between the edge of the shield 7 and the rim of the main headlight increases towards the bottom of the shield. Starting near the top of the edge of the shield, the outer edge is bent forwardly so that the curve is brought outward and forward. The extent of this bend preferably increases toward the lower part of the shield, and it may be found desirable to make a greater curvature on the right-hand side of the right shield than on the left-hand side of the left shield, thus permitting a greater amount of sidewise reflection upon the former side. The result will be to get better illumination at the right-hand side of the road, and to protect the eyes of the oncoming driver by having less sidewise reflection from the left side.

The effect of this sidewise bend 17 of the reflector 7, coupled with this reflector function, is that practically all the light coming directly from the light bulb 15, or indirectly from the main reflector, on the outer side of the center is deflected to and illuminates the sides of the road diagonally ahead of the car, excepting that portion which is thrown down and forward and illuminates the road directly in front of the car.

It will be obvious that the precise form of the side curvature 17 is not important. The essential thing is that the light, both direct and indirect, instead of being cut off absolutely from a part of the front is mainly deflected to the side, and that this forward bending of the side of the shield is carried far enough so that the reflections from the extreme forward part of the side of the main reflector can not cross over in front of the machine enough to trouble the driver of the other car.

It will also be apparent that with the novel shape of the deflector shield which I have described, and by the secondary reflector function which is given to the under side, the light is greatly intensified upon the road, not only immediately in front of the car but also for a relatively long distance ahead.

Having thus described my invention, what I claim is:

1. A shield for automobile headlights adapted to be positioned in front of a headlight, the front portion thereof being curved forwardly and upwardly with respect to the rear portion and a side thereof being curved upwardly and outwardly.

2. A shield for automobile headlights adapted to be positioned in front of a headlight, the front portion being up-turned with respect to the rear portion so as to deflect the light rays downwardly and forwardly, one side of said shield projecting laterally so as to block off lateral and forward projection of light rays at said side, the other side being curved so as to permit the escape of light rays laterally and forwardly at said lateral side.

3. A deflector shield and secondary reflector for automobile headlights, positioned in front of said headlights, said shield having a reflecting under surface, the front portion thereof being curved forwardly and upwardly with respect to the rear portion and the side thereof being curved upwardly and outwardly.

4. A deflector shield and secondary reflector for automobile headlights, positioned in front of said headlights main reflector, the front portion thereof being curved forwardly and upwardly with respect to the rear portion and a side thereof being curved upwardly and outwardly.

5. A deflector shield for automobile headlights located in front of said headlights, having its rear part inclined downwardly and its front part inclined forwardly, and having its outer portion inclined outwardly and forwardly, whereby the light is cut off from the upper front and the upper inner directions and concentrated, and reflected to the front and to the right as well as down, in combination with means for raising or lowering the shield into operative and inoperative positions.

In testimony whereof I hereby affix my signature.

MAURICE H. DONAHUE.